US006639434B1

(12) United States Patent
Rahman

(10) Patent No.: US 6,639,434 B1
(45) Date of Patent: Oct. 28, 2003

(54) LOW VOLTAGE DIFFERENTIAL SIGNALING SYSTEMS AND METHODS

(75) Inventor: Arifur Rahman, Yonkers, NY (US)

(73) Assignee: Lattice Semiconductor Corporation, Hillsboro, OR (US)

(*) Notice: Subject to any disclaimer, the term of this patent is extended or adjusted under 35 U.S.C. 154(b) by 0 days.

(21) Appl. No.: 10/266,361

(22) Filed: Oct. 7, 2002

(51) Int. Cl.[7] ................................. H03B 1/00
(52) U.S. Cl. ......................... 327/108; 327/309
(58) Field of Search .................. 327/99, 108, 112, 327/309, 407, 63, 65, 69; 326/82–87, 30, 38, 62

(56) References Cited

U.S. PATENT DOCUMENTS 5,920,204 A * 7/1999 Bruno .................. 326/86
6,111,431 A * 8/2000 Estrada ................ 326/83
6,366,128 B1 * 4/2002 Ghia et al. ............ 326/83
6,504,403 B2 * 1/2003 Bangs et al. .......... 327/62

OTHER PUBLICATIONS

Andrea Boni et al., "LVDS I/O Interface for Gb/s–per–Pin Operation in 0.35–$\mu$m CMOS", IEEE Journal of Solid–State Circuits, vol. 36, No. 4, Apr. 2001, pp. 706–711.

* cited by examiner

Primary Examiner—My-Trang Nu Ton
(74) Attorney, Agent, or Firm—MacPherson Kwok Chen & Heid LLP; Greg J. Michelson

(57) ABSTRACT

A low voltage differential signaling driver is disclosed that is capable of supporting many different LVDS standards or signal level requirements. The low voltage differential signaling driver has a programmable offset voltage and a programmable differential output voltage, which may be programmed independently.

18 Claims, 3 Drawing Sheets

LOW VOLTAGE DIFFERENTIAL SIGNALING SYSTEMS AND METHODS

BACKGROUND

1. Technical Field

The present invention relates generally to electrical circuits and, more particularly, to interface circuits to support, for example, low voltage differential signaling.

2. Related Art

Low voltage differential signaling (LVDS) has emerged as a popular differential data transmission method. LVDS offers many advantages, such as low noise and low power while providing a robust and high-speed data transmission.

Because of its many advantages, LVDS has been deployed across market segments for numerous applications. As a result, there exist a number of different types of LVDS standards or signal level requirements. For example, IEEE standard 1596.3 and HyperTransport specifications employ LVDS, but have different signaling level requirements, such as for the offset voltage (or common mode voltage level) or the differential output voltage swing.

A drawback of having numerous LVDS signal level requirements is that a device is typically designed to support only one specific type of LVDS, which limits the device's applicability. Alternatively, the device is implemented with a specific circuit to support each respective type of LVDS. A drawback of this approach is that it becomes difficult to select which combination of specific circuits should be incorporated into the device due to the number of existing LVDS signal level requirements and the rapid pace at which they continue to emerge and evolve. As a result, there is a need for systems and methods that address the various LVDS requirements.

BRIEF SUMMARY

Systems and methods are disclosed herein for supporting two or more LVDS signal level requirements. For example, in accordance with an embodiment of the present invention, an LVDS driver (or buffer) supports two different LVDS signal level requirements by having a programmable common mode voltage (offset voltage). Furthermore, other parameters, such as the bias current or differential output voltage may also be programmable. As a result, by utilizing the techniques discussed herein, one LVDS driver can support many different LVDS standards or signal level requirements. As an example, an LVDS driver in accordance with an embodiment of the present invention can be provided for a programmable device, such as a complex programmable logic device, a programmable logic device, or a field programmable gate array, to support various LVDS interface requirements.

More specifically, in accordance with one embodiment of the present invention, a driver includes a multiplexer adapted to select from a plurality of reference voltages; an amplifier, coupled to the multiplexer, adapted to receive the reference voltage selected by the multiplexer and set an offset voltage of the driver based on the reference voltage; a current source circuit, coupled to the amplifier, adapted to provide an output current for the driver; a plurality of transistors, coupled to the current source circuit and to a data line, adapted to route the output current to produce a positive voltage differential output or a negative voltage differential output based on a data value on the data line; and a current limiting circuit, coupled to the plurality of transistors, adapted to limit the output current to a value that provides a desired differential output voltage.

In accordance with another embodiment of the present invention, a driver includes means for selecting one of a plurality of offset voltages; means for providing a driver current to generate a positive differential voltage or a negative differential voltage based on a data signal; and means for selecting one of a plurality of values for the driver current to provide a desired differential voltage level for the positive differential voltage and the negative differential voltage.

In accordance with another embodiment of the present invention, a method of providing a plurality of low voltage differential signal levels from a single driver includes programming a desired offset voltage based on a plurality of selectable reference voltages; providing a programmable current source to generate a driver current; channeling the driver current to provide a positive differential output voltage or a negative differential output voltage based on a value of a data signal; and limiting the driver current to a specified value to provide a desired value for the positive differential output voltage and the negative differential output voltage.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

The preferred embodiments of the present invention and their advantages are best understood by referring to the detailed description that follows. It should be appreciated that like reference numerals are used to identify like elements illustrated in one or more of the figures.

DETAILED DESCRIPTION

Figure 1:
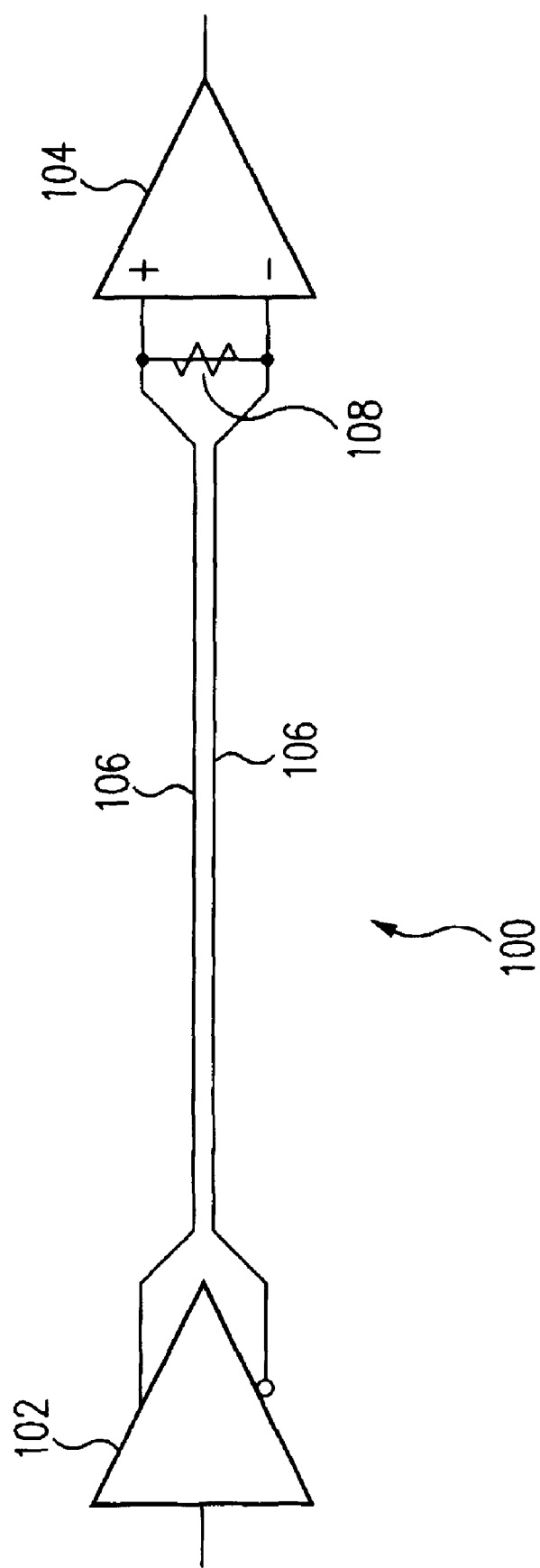
FIG. 1 shows a circuit schematic illustrating a low voltage differential signaling system in accordance with an embodiment of the present invention.

FIG. 1 shows a circuit schematic illustrating a low voltage differential signaling (LVDS) system 100 in accordance with an embodiment of the present invention. LVDS system 100 includes a driver 102 and a receiver 104. Driver 102 and receiver 104 are generally located on separate chips, boards, or devices and coupled through lines 106 (e.g., a wire pair, a differential wire pair, two printed circuit board traces, or a balanced cable). A resistor 108 is positioned as a load near receiver 104 and across lines 106. Resistor 108 (or load resistor) may have, for example, a resistance of 100 Ω or some other desired value, depending upon the application, such as to match the impedance of the transmission line.

LVDS system 100 is shown as a unidirectional point-to-point link and, therefore, a second LVDS system 100 would be required to provide, in combination, data in both directions. LVDS system 100 is not limited, however, to this one type of configuration. Various other device or system configurations are possible, such as for example bi-directional half-duplex, multidrop, multipoint, and/or the incorporation of a data distribution buffer, a repeater, or a crosspoint switch.

Figure 2:
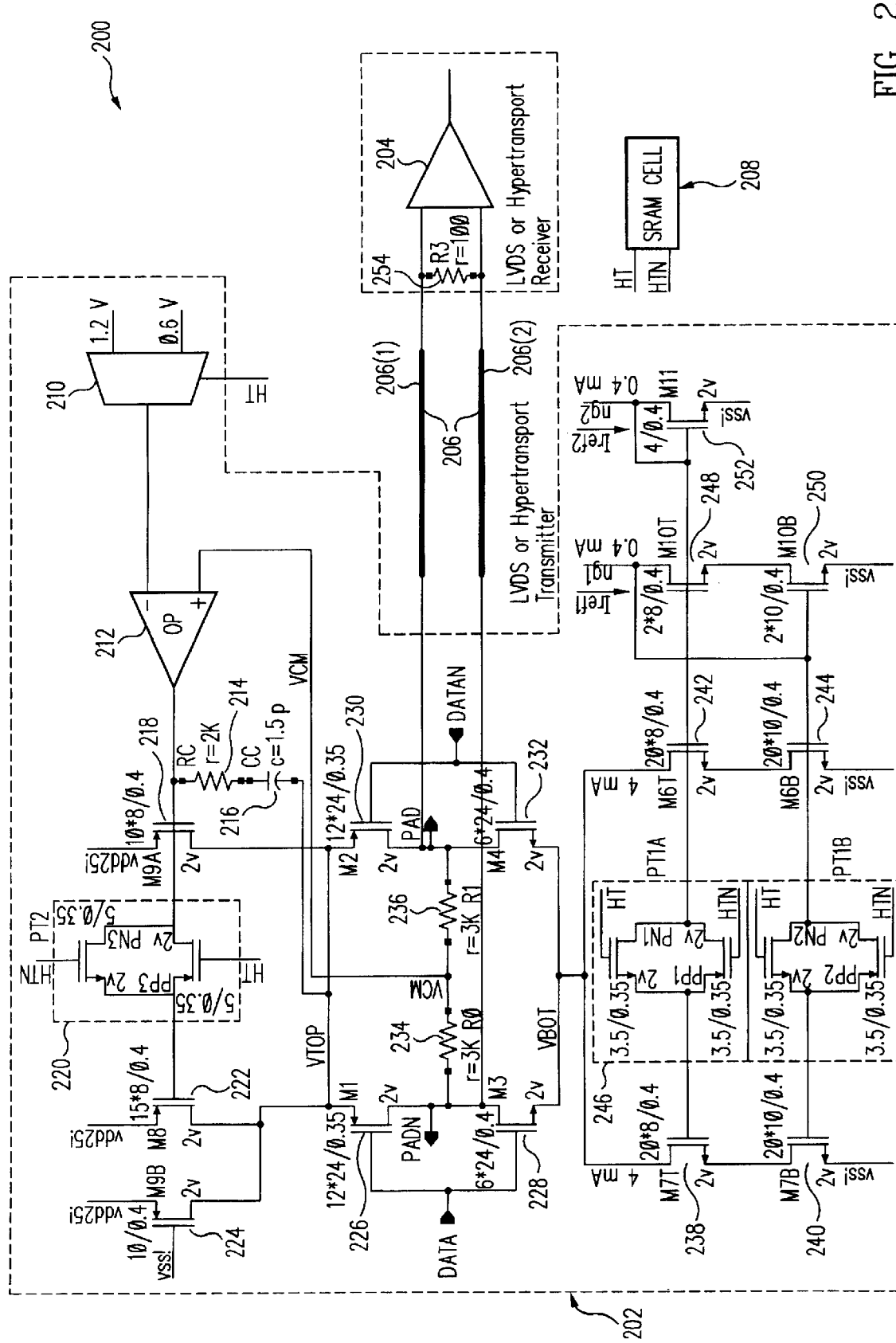
FIG. 2 shows a circuit schematic illustrating a low voltage differential signaling system in accordance with an embodiment of the present invention.

FIG. 2 shows a circuit schematic illustrating a LVDS system 200 in accordance with an embodiment of the present invention. LVDS system 200 includes a driver 202 and a receiver 204, which are coupled through lines 206 (which are separately referenced as lines 206(1) and 206(2)). LVDS system 200 may be viewed as an exemplary embodiment of a detailed circuit schematic for LVDS system 100, with driver 202, receiver 204, and lines 206 corresponding respectively to driver 102, receiver 104, and lines 106.

Driver 202 includes a multiplexer 210 that selects one of two reference voltages (e.g., 1.2 V or 0.6 V) based on a value of a control signal (labeled HT at an input control terminal of multiplexer 210). The control signal may be supplied, for example, by a memory cell 208 (e.g., a programmable static random access memory (SRAM) cell). As an example, if memory cell 208 is programmed with a logical true value (i.e., a logical one), then the output signal (labeled HT) of memory cell 208 applied to multiplexer 210 forces the selection of one reference voltage (e.g., the 0.6 V reference voltage). If memory cell 208 is programmed with a logical false value (i.e., a logical zero), then the output signal (HT) of memory cell 208 applied to multiplexer 210 forces the selection of the other reference voltage (i.e., the 1.2 V reference voltage).

Multiplexer 210 provides the selected reference voltage to an operational amplifier 212, which utilizes the selected reference voltage to force the common mode voltage (also referred to as offset voltage ($V_{os}$)), at a node VCM disposed between resistors 234 and 236, to the value of the selected reference voltage. The output of operational amplifier 212 controls a gate voltage of transistor 218 and also a gate voltage of transistor 222 through a pass gate 220. A resistor 214 and a capacitor 216 provide an optional feedback path to help stabilize operational amplifier 212.

Pass gate 220 is controlled by a control signal that determines whether transistor 222 is in an on-state and controlled by operational amplifier 212 or is in an off-state. For example, the control signal may be the same control signal that controls multiplexer 210 and, thus the control signal and its complement (labeled HT and HTN, respectively) control pass gate 220. Transistor 222 may be selectively employed to meet additional current needs that are required for the desired differential output voltage of the selected LVDS standard.

A transistor 224, in parallel with transistor 222, assists transistor 218 and possibly transistor 222 (depending upon pass gate 220) in providing sufficient voltage and current requirements to transistors 226, 228, 230, and 232 and achieve the desired common mode voltage. Transistor 224, in parallel with transistor 218 and 222, also helps to average out any performance differences that may be associated with transistors 218 and 222, such as their resistivity for example, as adjusted by operational amplifier 212. Transistors 218, 224, and optionally transistor 222 form a current source to provide a current through lines 206.

Transistors 218, 222, and 224 receive a supply voltage (labeled vdd25!) that provides a sufficient voltage for the desired application. For example, the supply voltage (vdd25!) may be 2.5 V. Transistor 224 has a gate voltage of 0.0 V (labeled vss!, which refers to a ground voltage in the figures), which ensures that transistor 224 is always switched on. When pass gate 220 decouples transistor 222 from transistor 218, a gate terminal of transistor 222 may be tied to the supply voltage via a pull-up transistor (not shown) to ensure that transistor 222 remains switched off.

It should also be noted that many of the transistors in the figures have a 2 v notation (e.g., transistors 218, 222, and 224 have the 2 v notation near their drain terminal), which indicates that the transistors fall within a family of 2 V transistors and does not indicate an intended voltage level at that point. However, this is not limiting and the selection of the transistor will depend upon the desired application or signal requirements.

A data signal (labeled DATA) and its complement (labeled DATAN) are provided to gate terminals of transistors 226 and 228 and transistors 230 and 232, respectively. For example, if the data signal is a logical true (and therefore its complement is a logical false), then transistors 228 and 230 will be switched on and transistors 226 and 232 will be switched off. This allows a current supplied by transistors 218, 224, and possibly 222, to flow through transistor 230, line-206(1), a resistor 254, line 206(2), and transistor 228. If the data signal is a logical false, then transistors 226 and 232 will be switched on and transistors 228 and 230 will be switched off. This allows a current supplied by transistors 218, 224, and possibly 222, to flow through transistor 226, line 206(2), resistor 254, line 206(1), and transistor 232. Therefore, a positive voltage differential or a negative voltage differential, respectively, across resistor 254 can be detected by receiver 204 (e.g., an amplifier or other type of LVDS receiver as known in the art). Transistors 226, 228, 230, and 232 may be referred to as a current steering driver.

The amount of current flowing through resistor 254 is determined by the current limiting circuit that includes transistors 238, 240, 242, 244, 248, 250, and 252, along with a pass gate 246. A reference current (labeled Iref1) is provided to transistor 248 and, due to the current mirror configuration, is mirrored to transistors 238 through 244. A reference current (labeled Iref2) is provided to transistor 252 and is used to bias transistors 238, 242, and 248.

Due to the arrangement of the transistors and common gate voltages, the amount of current flowing through transistors 248 and 250 will partly determine (due to the current mirror configuration) the amount of current that is allowed to flow through transistors 238, 240, 242, and 244. The respective sizes of transistors 238, 240, 242, 244, 248, and 250 will also determine the amount of current flowing through each transistor. Transistor 252 provides the appropriate gate bias (or bias current) to transistors 238, 242, and 248.

For example, the reference current may be a value of 0.4 mA provided to transistor 248 and 250 and also to transistor 252. The size of transistors 248 and 250 are 2*8/0.4 and 2*10/0.4, respectively, while the size of transistors 242 and 244 are 20*8/0.4 and 20*10/0.4, respectively. Because transistors 242 and 244 are approximately ten times larger than corresponding transistors 248 and 250, the amount of current flowing through transistors 242 and 244 will be approximately ten times larger than through transistors 248 and 250. Therefore, for the given exemplary sizes, if approximately 0.4 mA is flowing through transistors 248 and 250, then approximately 4 mA will be flowing through transistors 242 and 244.

The current limiting circuit may be viewed as a type of cascode current mirror. Transistor 252 provides a gate bias for transistors 248, 242, and 238, while transistors 238 through 244 are in a current mirror arrangement with transistors 248 and 250.

Pass gate 246 determines whether transistors 238 and 240 are switched on to permit additional current to flow through resistor 254. For example, if pass gate 246 couples the gate terminals of transistors 238 and 240 to corresponding transistors 242 and 244, then transistors 238 and 240 are switched on and current is allowed to flow through them. Because transistors 238 and 240 are the same size as transistors 242 and 244 in this example, then an additional current of 4 mA will flow through resistor 254.

If pass gate 246 is switched off so that transistors 238 and 240 are not coupled to transistors 242 and 244, then transistors 238 and 240 are switched off and no current flows through transistors 238 and 240. To ensure that transistors 238 and 240 remain switched off when pass gate 246 decouples transistors 238 and 240 from transistors 242 and 244, the gate terminals of transistors 238 and 240 may be tied to ground voltage via a pull-down transistor (not shown). Pass gate 246 may be controlled by the control signals from memory cell 208, as described above for pass gate 220. Alternatively, pass gates 220 and 246 may be controlled independently by separate corresponding memory cells (not shown).

As an example of circuit operation, LVDS system 200 is shown in an exemplary embodiment as supporting two different types of LVDS requirements. The LVDS requirements for the first type, also referred to herein as general LVDS, requires an offset voltage (common mode voltage) of 1.2 V and a differential output voltage (voltage drop across resistor 254) of ±400 mV. The LVDS requirements for the second type, also referred to herein as HyperTransport LVDS or a variation of HyperTransport LVDS, requires an offset voltage of 0.6 V and a differential output voltage of ±800 mV.

For general LVDS (first type of LVDS requirements), memory cell 208 is programmed with a logical false value (e.g., zero volts or 0.0 V), which results in multiplexer 210 providing the 1.2 V reference voltage, pass gate 220 coupling transistor 222 to transistor 218 to allow operational amplifier 212 to switch on transistor 222, and pass gate 246 uncoupling transistors 238 and 240 from corresponding transistors 242 and 244 to switch off transistors 238 and 240.

Operational amplifier 212 sets the offset voltage (at the node VCM) approximately equal to the reference voltage of 1.2 V, which satisfies the first requirement of the general LVDS type. With transistors 238 and 240 switched off, only 4 mA is allowed to flow through resistor 254 and ultimately through transistors 242 and 244, which satisfies the second requirement of the general LVDS type (i.e., the differential output voltage will be equal to ±400 mV due to 4 mA flowing through resistor 254 of 100 Ω).

If the data signal is a logical true value, then approximately 1.4 V will be provided to line 206(1), a voltage drop of 400 mV will occur across resistor 254, and approximately 1.0 V will be provided back to driver 202 through line 206(2). The 4 mA current will then flow through transistors 242 and 244. If the data signal is a logical false value, then approximately 1.4 V will be provided to line 206(2) and approximately 1.0 V will be provided back to driver 202 through line 206(1). Consequently, a voltage drop of approximately 0.2 V will occur across resistor 234 and also across resistor 236 for a logical true or false data signal value, such that an offset voltage of 1.2 V at the node VCM is maintained.

For the HyperTransport LVDS (second type of LVDS requirements), memory cell 208 is programmed with a logical true value (e.g., 2.5 V), which results in multiplexer 210 providing the 0.6 V reference voltage, pass gate 220 uncoupling transistor 222 from transistor 218 to switch off transistor 222, and pass gate 246 coupling transistors 238 and 240 to corresponding transistors 242 and 244. Transistor 222 is switched off to help accommodate the lower required offset voltage.

Operational amplifier 212 sets the offset voltage (at the node VCM) approximately equal to the reference voltage of 0.6 V, which satisfies the first requirement of the HyperTransport LVDS type. With transistors 238 and 240 switched on, 8 mA is allowed to flow through resistor 254 and ultimately to transistors 248, 240, 242, and 244, which satisfies the second requirement of the HyperTransport LVDS type (i.e., the differential output voltage will be equal to ±800 mV due to 8 mA flowing through resistor 254 of 100 Ω).

If the data signal is a logical true value, then approximately 1.0 V will be provided to line 206(1), a voltage drop of 800 mV will occur across resistor 254, and approximately 0.2 V will be provided back to driver 202 through line 206(2). If the data signal is a logical false value, then approximately 1.0 V will be provided to line 206(2) and approximately 0.2 V will be provided back to driver 202 through line 206(1). Consequently, a voltage drop of approximately 0.4 V will occur across resistor 234 and also across resistor 236 for a logical true or false data signal value, such that an offset voltage of 0.6 V at the node VCM is maintained.

Figure 3:
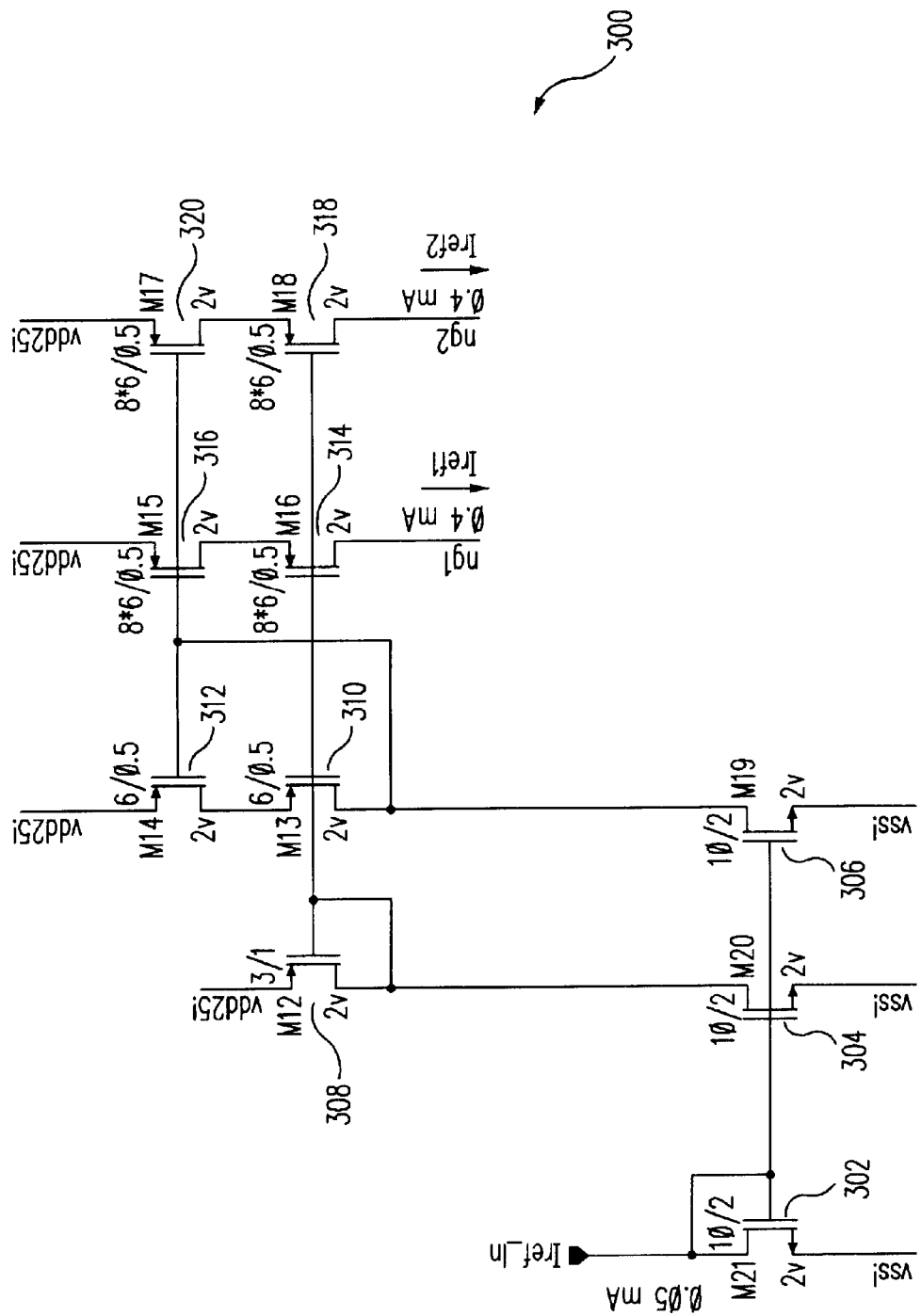
FIG. 3 shows an exemplary circuit schematic for providing a reference current for the low voltage differential signaling system of FIG. 2.

FIG. 3 shows an exemplary circuit schematic 300 for providing a reference current for LVDS system 200 of FIG. 2. Circuit schematic 300 illustrates an exemplary technique for providing the reference current (also referred to as a bias current or a tail current), but this is not limiting and various other methods for providing a reference current may be employed that are known and applicable.

Circuit schematic 300 includes transistors 302 through 320, which form a type of cascode current mirror. Transistor 302 receives a reference current (labeled Iref_In) of approximately 0.05 mA. With the gate terminals of transistors 302, 304, and 306 coupled and the transistors being of equal size, approximately 0.05 mA will also flow through transistors 304 and 306.

Transistors 314 and 316 are approximately eight times larger than transistors 310 and 312 and, consequently, eight times the current will flow through transistors 314 and 316 due to their corresponding common gate terminals. Therefore, a current of 0.4 mA (i.e., 8 times 0.05 mA) will flow through transistors 314 and 318, with transistor 314 supplying the 0.4 mA to transistor 248 (at a node labeled ng1) and transistor 318 supplying the 0.4 mA to transistor 252 (at a node labeled ng2).

It should be understood that the systems and methods discussed herein are applicable to a wide range of applications and may be implemented to support a number of different types of LVDS requirements or specifications. For example, rather than only being able to select between two offset voltages, multiplexer 210 may be replaced with a larger multiplexer (e.g., a 4:1 or an 8:1 multiplexer) to allow the selection of many different offset voltages. As an example for a 4:1 multiplexer, two memory cells may be provided for selection of one of the four reference voltages available to the 4:1 multiplexer.

Furthermore, the current limiting circuit of transistors 238 through 244 and transistors 248 through 252 may be modified or expanded to provide different current values or allow a number of selectable currents to provide a corresponding number of selectable differential output voltages. As an example, the size of the various transistors may be adjusted to provide the desired current. Specifically for one example, transistors 238 and 240 may be reduced in size from 20*8/0.4 and 20*10/0.4 to 10*8/0.4 and 10*10/0.4, respectively. Therefore, a current value of 6 mA would be provided for the HyperTransport LVDS example discussed herein (i.e., 4 mA through transistors 242 and 244 and 2 mA through transistors 238 and 240) rather than a current of 8 mA. This configuration would satisfy a HyperTransport technology specification of 0.6 V offset voltage and a ±600 mV differential output voltage across a 100 Ω resistor.

Additional current branches, such as represented by transistors 238 and 240, could also be added along with corresponding pass gates to selectively choose the number of current branches and, ultimately, the differential output voltage ($V_{OD}$). A number of memory cells may be used so that the offset voltage and the differential output voltage could be independently selectable. The amount of reference current provided by circuit schematic 300 may also be varied or selected (e.g., programmable reference current values or selectable values for the reference current) to assist in determining the differential output voltage.

An additional resistive load may be added, if necessary, to satisfy certain LVDS requirements. For example, a resistor (e.g., 100 Ω) may be placed across lines 206(1) and 206(2) near driver 202 to satisfy certain input impedance requirements or line termination requirements associated with driver 202 (e.g., to suppress reflected waves). The driver current could then be adjusted, as described herein for the current limiting circuit (e.g., transistors 238 through 244), to satisfy the desired differential output voltage requirements. Furthermore, the resistor near driver 202 may also be programmable or selectable to enable, disable (disconnect the resistor from the circuit), or vary the resistivity, depending upon the application. Also, the resistor may be incorporated into or be part of driver 202 and likewise, resistor 254 may be incorporated into or be part of receiver 204.

By having one circuit support more than one type of LVDS system, additional advantages may be obtained. For example, the required surface area of the LVDS driver (e.g., driver 202) on a chip substrate may be substantially less (e.g., 50%) as compared to the area consumed by separate circuits to support the corresponding LVDS systems. Additionally, different types of drivers (e.g., buffers) may share the same input/output pad or pin.

Embodiments described above illustrate but do not limit the invention. It should also be understood that numerous modifications and variations are possible in accordance with the principles of the present invention. Accordingly, the scope of the invention is defined only by the following claims.

I claim:

1. A driver comprising:
   a multiplexer adapted to select from a plurality of reference voltages;
   an amplifier, coupled to the multiplexer, adapted to receive the reference voltage selected by the multiplexer and set an offset voltage of the driver based on the reference voltage;
   a current source circuit, coupled to the amplifier, adapted to provide an output current for the driver;
   a plurality of transistors, coupled to the current source circuit and to a data line, adapted to route the output current to produce a positive differential output voltage or a negative differential output voltage based on a data value on the data line; and
   a current limiting circuit, coupled to the plurality of transistors, adapted to limit the output current to a value that provides a desired differential output voltage.

2. The driver of claim 1, wherein the driver is coupled through a wire pair to a receiver to form a low voltage differential signaling system, wherein the receiver measures the positive differential output voltage or the negative differential output voltage across a load.

3. The driver of claim 1, further comprising at least one memory cell, coupled to the multiplexer, adapted to control the selection of the reference voltage by the multiplexer.

4. The driver of claim 1, wherein the current source circuit comprises a first, second, and third transistor in parallel, with the first and second transistor controlled by the amplifier.

5. The driver of claim 4, wherein the current source circuit further comprises a pass gate coupled between the first transistor and the second transistor, the pass gate receiving a control signal that determines whether the pass gate couples the second transistor to the amplifier.

6. The driver of claim 5, further comprising a memory cell that provides the control signal to the pass gate.

7. The driver of claim 5, wherein the third transistor during operation is switched on to minimize performance differences associated with the first and second transistor.

8. The driver of claim 1, wherein the current limiting circuit is programmable such that a value of the output current is selectable to provide corresponding values for the differential output voltage.

9. The driver of claim 8, wherein the current limiting circuit comprises:
   at least two current paths having transistors that regulate an amount of current flowing through the current path; and
   a pass gate, coupled to at least two of the current paths, which receives a control signal that determines whether one of the current paths allows the regulated amount of current to flow through the current path.

10. The driver of claim 9, farther comprising a memory cell that provides the control signal to the pass gate.

11. A driver comprising:
    means for selecting one of a plurality of offset voltages;
    means for providing a driver current and the selected offset voltage to generate a positive differential voltage or a negative differential voltage based on a data signal; and
    means for selecting one of a plurality of values for the driver current to provide a desired differential voltage level for the positive differential voltage and the negative differential voltage.

12. The driver of claim 11, wherein the means for selecting one of the plurality of offset voltages comprises:
    a multiplexer that selects one of a plurality of reference voltages; and
    an amplifier, coupled to the multiplexer, that receives the selected reference voltage and sets an offset voltage based on the selected reference voltage.

13. The driver of claim 12, wherein the providing means comprises:
    a plurality of parallel transistors to provide the driver current, with the number of parallel transistors selectable;
    a first pair of transistors that guide the driver current to generate the positive differential voltage when the data signal is asserted; and
    a second pair of transistors that guide the driver current to generate the negative differential voltage when the data signal is deasserted.

14. The driver of claim 13, wherein the means for selecting one of the plurality of values for the driver current comprises a plurality of parallel current paths, with the number of parallel current paths selectable.

15. The driver of claim 14, wherein the driver is coupled through a differential wire pair to a receiver to form a low voltage differential signaling system.

16. A method of providing a plurality of low voltage differential signal levels from a single driver, the method comprising:

programming a desired offset voltage based on a plurality of selectable reference voltages;

providing a programmable current source and the offset voltage to generate a driver current;

channeling the driver current to provide a positive differential output voltage or a negative differential output voltage based on a value of a data signal; and limiting the driver current to a specified value to provide a desired value for the positive differential output voltage and the negative differential output voltage.

17. The method of claim 16, wherein the limiting of the driver current is programmable to provide a plurality of selectable values for the driver current.

18. The method of claim 17, further comprising providing a reference current which is employed to derive the plurality of selectable values.

* * * * *